United States Patent

[11] 3,611,282

| | | | |
|---|---|---|---|
| [72] | Inventor | Stanley J. Hill |
| | | Ridgefield, Conn. |
| [21] | Appl. No. | 848,615 |
| [22] | Filed | Aug. 8, 1969 |
| [45] | Patented | Oct. 5, 1971 |
| [73] | Assignee | United Aircraft Corporation |
| | | East Hartford, Conn. |

[54] FLAMEOUT DETECTOR
19 Claims, 1 Drawing Fig.

[52] U.S. Cl. .................................................. 340/27,
73/407 PR, 73/116, 60/39.09
[51] Int. Cl. ............................................................ G08g 5/00
[50] Field of Search.............................................. 340/212,
213, 214, 27 R; 178/696; 235/150.2, 150.21;
73/116, 407 PR, 117.3; 60/39.09, 223

[56] References Cited
UNITED STATES PATENTS

| 2,969,640 | 1/1961 | Reed .............................. | 60/35.6 |
|---|---|---|---|
| 2,981,058 | 4/1961 | Reed .............................. | 60/35.6 |
| 2,986,929 | 6/1961 | Reed .............................. | 73/116 |
| 3,232,051 | 2/1966 | Mansfield, Jr. et al........ | 60/39.09 |
| 2,783,453 | 2/1957 | Rose............................... | 340/414 X |
| 3,120,758 | 2/1964 | Craddock et al. ............. | 73/341 |
| 3,426,322 | 2/1969 | Balo............................... | 73/116 |

Primary Examiner—Kathleen H. Claffy
Assistant Examiner—Jan S. Black
Attorney—Shenier and O'Connor ABSTRACT: A flameout detector for aircraft having a plurality of jet engines comprises a corresponding plurality of transducers, each providing an output voltage in accordance with a turbine-discharge pressure. The transducer outputs are compared to determine the maximum and minimum voltages. If the ratio of the minimum to the maximum voltage is appreciably less than unity, a warning signal is provided to indicate that a flameout has occurred in one of the engines. The minimum voltage is compared with each of the transducer outputs to identify the particular engine which is malfunctioning.

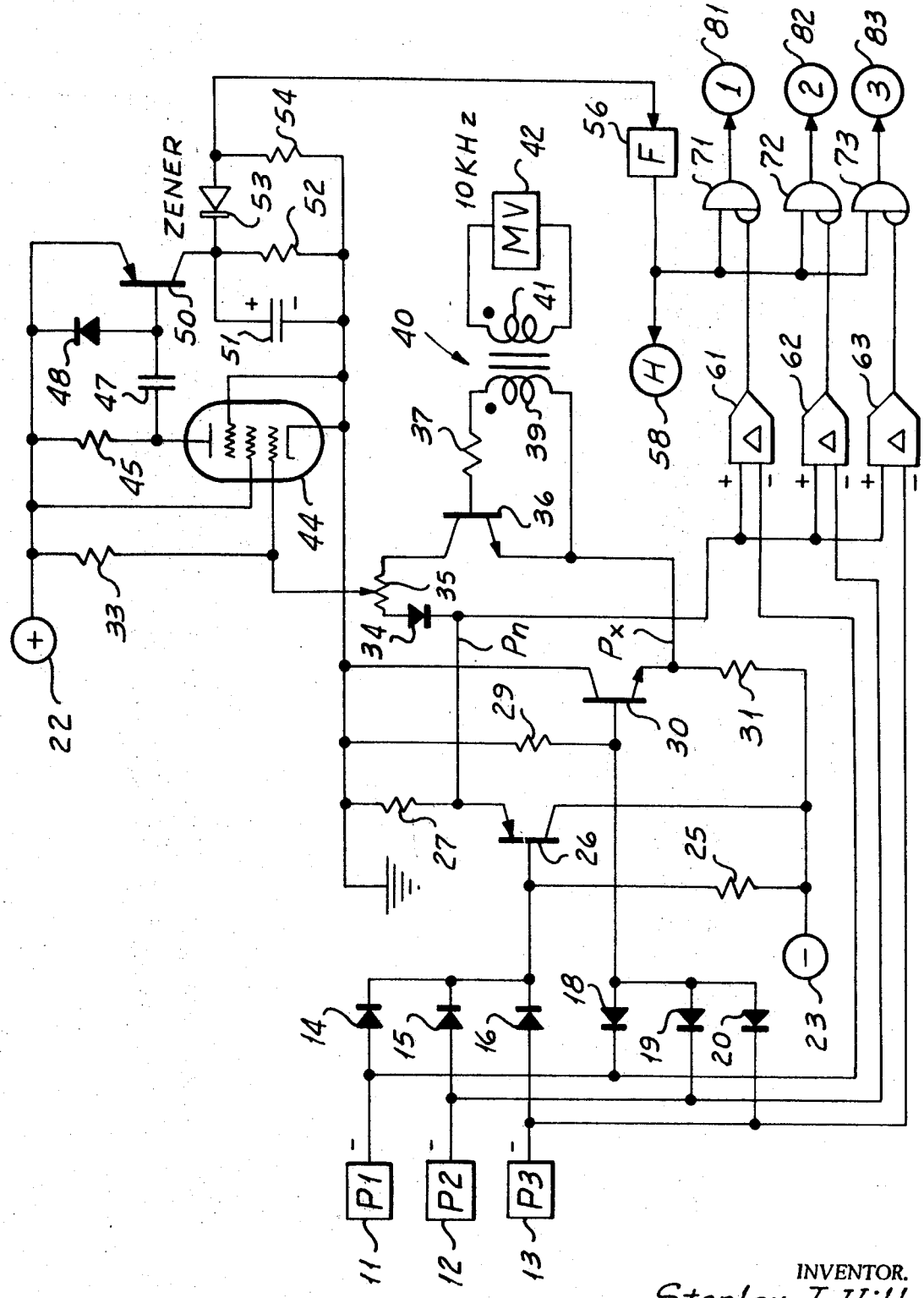

FLAMEOUT DETECTOR

SUMMARY OF THE INVENTION

One object of my invention is to provide a flameout detector which responds to differences in operation of a plurality of jet engines.

Another object of my invention is to provide a flameout detector which responds to a turbine-discharge pressure.

Still another object of my invention is to determine the minimum and maximum pressures provided by a plurality of jet engines.

A further object of my invention is to determine the ratio of the minimum to the maximum pressure to provide a general warning signal.

A still further object of my invention is to compare the minimum engine pressure with each of the engine pressures to identify the particular engine which is malfunctioning.

Other and further objects of my invention will appear from the following description.

BRIEF DESCRIPTION OF THE DRAWING

The accompanying drawing, which forms part of the instant specification and is to be read in conjunction therewith, is a schematic view illustrating a preferred embodiment of my invention.

DESCRIPTION OF THE PREFERRED EMBODIMENT

Referring now more particularly to the drawing, an aircraft may have, for example, three jet engines. Each of the engines is provided with a transducer which measures a turbine-discharge pressure. This pressure is dependent upon the combustion process and provides an immediate indication of an engine flameout. One pressure which might be sensed for each engine is the discharge of the high-pressure turbine of twin-spool engines. Alternatively, I may measure the discharge pressure of each low-pressure turbine, which is the inlet pressure of the exhaust nozzle. Pressure transducers 11, 12, and 13 provide negative electrical outputs proportional to corresponding turbine-discharge pressures of each of the three jet engines. The outputs of transducers 11, 12, and 13 are coupled forwardly through respective crystals 14, 15, an 16 to the base of a PNP transistor 26. The base of transistor 26 is connected to a negative-voltage source 23 through a resistor 25. Source 23 provides a negative voltage which appreciably exceeds the maximum negative output of transducers 11 through 13. The outputs of transducers 11, 12, and 13 are connected backwardly through respective crystals 18, 19, and 20 to the base of an NPN transistor 30. The base of transistor 30 is grounded through a resistor 29. Transistor 26 operates as an emitter follower, the collector of which is connected to negative source 23 and the emitter of which is grounded through a resistor 27. Transistor 30 also operates as an emitter follower, the collector of which is grounded and the emitter of which is coupled to negative source 23 through a resistor 31. The emitter of transistor 26 is connected backwardly through a crystal 34 to one terminal of a potentiometer 35. The other terminal of potentiometer 35 is connected to the collector of a chopper transistor 36, the emitter of which is coupled to the emitter of transistor 30. The slider of potentiometer 35 is connected to the control grid of a pentode 44. The control grid of pentode 44 is coupled through a resistor 33 to a positive voltage source 22.

A 10 kHz. free-running multivibrator 42 provides a square wave output of substantially unity mark-space ratio which excites the primary winding 41 of a transformer 40. The output across the secondary winding 39 of transformer 40 is coupled between the emitter and base of transistor 36 through a resistor 37.

The cathode and the suppressor grid of pentode 44 are both grounded. The screen grid of pentode 44 is connected to positive source 22. The plate of pentode 44 is coupled through a resistor 45 to a positive source 22. The plate of pentode 44 is further coupled through a capacitor 47 to the base of a PNP transistor 50. The base of transistor 50 is coupled forwardly through a crystal 48 to positive source 22. The emitter of transistor 50 is connected to positive source 22; and the collector thereof is grounded through the parallel combination of resistor 52 and capacitor 51. The collector of transistor 50 is coupled backwardly through a Zener diode 53 to the input of a bistable trigger or flip-flop circuit 56. The input of trigger circuit 56 is grounded through resistor 54; and the output thereof actuates an audible warning horn 58 in the pilot's compartment of the aircraft.

The output of trigger circuit 56 is coupled to an enabling input of each AND circuits 71, 72, and 73. The emitter of transistor 26 is coupled to a positive input of each of differential amplifiers 61, 62, and 63. The outputs of transducers 11 and 12, and 13 are connected to respective negative inputs of differential amplifiers 61, 62, and 63. The outputs of differential amplifiers 61, 62, and 63 are connected to respective inhibiting inputs of AND circuits 71, 72, and 73. The outputs of AND circuits 71, 72, and 73 actuate respective warning lights 81, 82, and 83 positioned on the instrument panel in view of the pilot.

In operation of my invention, the thrust settings of all engines are substantially equal for various modes of flight; and with all engines operating normally it is to be expected that the outputs of transducers 11, 12 and 13 are substantially equal with only minor percentage variations. The OR circuit comprising crystals 14 through 16 and resistor 25 provides an output at the base of transistor 26 in accordance with the least negative of the outputs of transducers 11 through 13. The OR circuit comprising crystals 18 through 20 and resistor 29 provides an output at the base of transistor 30 in accordance with the most negative of the outputs of transducers 11 through 13. The emitter output of transistor 26 thus represents the minimum pressure $Pn$ provided by any of the engines; and the emitter output of transistor 30 represents the maximum pressure $Px$ provided by any of the engines.

For example, assume that at 100 percent thrust settings, transducers 11, 12 an 13 provide respective negative outputs of $-9.9$ volts, $-10.0$ volts and $-10.1$ volts, and that source 23 provides a potential of $-15$ volts. Crystal 14 will be conductive and crystals 15 and 16 will be cut off. The potential at the base of the emitter follower transistor 26 will thus be governed by the minimum voltage output of transducer 11. In practice, the potential at the base of transistor 26 will be slightly more negative than $-9.9$ volts due to the voltage drop across the conducting diode 14. However, transistor 26 is a PNP device; and the emitter output is at a potential slightly more positive than the input at the base by virtue of the voltage drop across the emitter-base junction. Since the voltage drops of diode 14 and of the emitter-base junction of transistor 26 are substantially equal, the voltage at the emitter of transistor 26 will be substantially identical to the voltage output of transducer 11.

Crystals 20 will be conductive; and crystals 18 and 19 will be cut off. The potential at the base of emitter follower transistor 30 will thus be governed by the maximum voltage output of transistor 13. In practice, the potential at the base of transistor 30 will be slightly more positive than $-10.1$ volts due to the voltage drop across the conducting diode 20. However, transistor 30 is an NPN device; and the emitter output is at a potential slightly more negative than the input at the base by virtue of the voltage drop across the emitter-base junction. Since the voltage drops of diode 20 and of the emitter-base junction of transistor 30 are substantially equal, the voltage at the emitter of transistor 30 will be substantially identical to the voltage output of transducer 13.

If all engines are operating normally, then $Pn$ will be nearly equal to $Px$; and the ratio $Pn/Px$ will be approximately equal to unity. If a flameout occurs in one of the engines, then $Pn$ will decrease radically; and the ratio $Pn/Px$ will become much less than unity. It is desired to instrument or mechanize the equation $$1 - Pn/Px = (Px - Pn)/Px$$

Diode 34 and transistor 36 form a chopper which alternately applies voltages in accordance with Pn and Px to the control grid of pentode 44. The alternating-current component of the chopped input at the control grid of pentode 44 thus includes the difference term (Px−Pn) in the numerator of the equation. Pentode 44 is preferably of the remote or at least of the semiremote cutoff type providing a transconductance $Gm$ versus control-grid voltage $Vg$ characteristic which closely approximates a rectangular hyperbola, for control-grid voltages more negative than −1 volt, for example. Thus pentode 44 provides the characteristic $Gm\ Vg=K$, where $K$ is a constant and $Vg<=1$ volt. If the percentage difference between Pn and Px is small, then $Pn\doteq Px\doteq -Vg$; and $Gm\doteq K/Px$. Accordingly, the plate current output of pentode 44 is $Ip=Gm(Px-Pn)=K(Px-Pn)/Px$.

When the output voltage across the secondary winding 39 of transformer 40 is negative, transistor 36 is rendered nonconductive; and the potential of the control grid of pentode 44 rises until diode 34 is rendered conductive by virtue of the bias current flowing through resistor 33. Thus, the chopper transistor 36 nonconductive, the potential at the control grid of pentode 44 is determined by the Pn -emitter output of transistor 26.

When the output voltage of secondary winding 39 of transformer 40 is positive, transistor 36 is gated into conduction; the potential at the control grid of pentode 44 decreases to a value determined by the Px-emitter output of transistor 30; and diode 34 is rendered nonconductive. in practice, the alternate voltage appearing at the control grid of pentode 44 will be slightly in excess of Pn by virtue of the voltage drop across diode 34 and slightly in excess of Px by virtue of the voltage drop across transistor 36 in its conductive state. Since the voltage drops of diode 34 and of transistor 36 in their conductive states are substantially equal, the chopped voltage appearing at the control grid of pentode 44 will be substantially equal to (Px−Pn). Potentiometer 35 may be adjusted to balance the chopper and neutralize any slight inequality in the voltage drops of diode 34 and transistor 36 in their conductive states. It will be noted that since Px is always more negative than Pn, the chopper circuit comprising components 34 and 36 need include only one active element; namely, transistor 36.

The square wave plate current output of pentode 44 is coupled through capacitor 47 and subjected to half-wave rectification by diode 48 and to half-wave amplification by transistor 50. The half-wave collector current pulses of transistor 50 are smoothed by filter capacitor 51 to provide a direct-current voltage across resistor 52 proportional to (Px−Pn)/Px. If the voltage output across capacitor 51 and resistor 52 exceeds the voltage delay of Zener diode 53, a positive output appears across resistor 54 which triggers flip-flop 56 to actuate the audible warning horn 58. The "grounded" emitter transistor 50 preferably has a stable and hence moderately low current gain. The gain constant K of pentode 44 in conjunction with the current gain of transistor 50, the resistance of resistor 52, and the voltage delay of Zener diode 53 should be selected so that flip-flop 56 is triggered only if Pn differs from Px by more than the usual percentage for normal engines operated by approximately the same thrust settings.

For example, if the pilot's thrust controls are ordinarily set manually with a tolerance of 4 percent and the engines themselves have a manufacturing tolerance of 2 percent, then the sensitivity as determined by components 44, 50, 52, and 53 may be selected so that flip-flop 56 is triggered if Pn and Px differ by more than 9 percent to 15 percent.

Horn 58 provides a general audible warning that a flameout has occurred but does not indicate the particular engine which might require restarting. The output from trigger flip-flop 56 partially enabled AND circuits 71 through 73. The Pn output at the emitter of transistor 26 is applied to the positive input of each of differential amplifiers 61 through 63; and the outputs of transducers 11 through 13 are applied to respective negative inputs of these differential amplifiers. Accordingly, at all times two of amplifiers 61 through 63 will provide positive outputs, while the other differential amplifier will provide no output. Differential amplifiers 61 through 63 thus establish the particular engine which provides the Pn output from emitter follower 26. For example, again assume that at 100 percent thrust settings transducers 11, 12 and 13 provide respective outputs of −9.9 volts, −10.1 volts If components 44, 50, 52, and 53 are selected to trigger flip-flop 56 for differences between Pn and Px exceeding 10 percent, then horn 58 will be actuated if the magnitude of the negative output of transducer 11 decreases to less than 9.1 volts. Accordingly, if a flameout occurs in Engine No. 1, horn 58 will be actuated with respective outputs from transducers 11, 12, and 13 of −9.1 volts, −10.0 volts, and −10.1 volts. For each of differential amplifiers 62 and 63, the −9.1 volt potentials applied at the positive inputs are more positive than the voltages applied at the negative inputs. Each of differential amplifiers 62 and 63 provides a positive output which inhibits AND circuits 72 and 73 from actuating indicator lights 82 and 83. However, the voltages applied at the positive and negative inputs of differential amplifier 61 are substantially equal since transducer 11 provides the Pn output of emitter follower 26. Accordingly, differential amplifiers 61 fails to inhibit AND circuit 71; and the output of flip-flop 56 is coupled through AND circuit 71 to actuate indicator light 81 and thereby inform the pilot of the particular engine which requires attention.

If an engine is operating normally, the gases issuing from the combustor outlet will have been heated to a high temperature and are of relatively low density; and the pressure drop in the turbine for a given engine speed is relatively low. However, if a flameout occurs, the gases issuing from the combustor outlet will decrease in temperature and become of relatively high density; and the pressure drop in the turbine for such engine speed will increase, so that the discharge pressure of the turbine will decrease. It will be seen that the discharge pressure of the turbine provides an immediate indication of any changes in the quantity of heat added in the combustor.

In the prior art, it has been attempted to sense an engine flameout by measuring either the temperature of the gases at some point downstream of the combustor or by measuring engine speed. Neither of these measurements provides an adequate rate of response to changes in the quantity of heat added in the combustor. In my flame out detector, an immediate flameout indication is provided by the measurement of turbine-discharge pressure. This affords ample time to restart an engine while its compressor speed is still high so that the resulting high temperature of the compressed air at the inlet of the combustor insures good fuel volatilization and ready ignition.

It will be seen that I have accomplished the objects of my invention. My flameout detector responds to differences in turbine-discharge pressures of a plurality of jet engines. My detector provides an immediate warning of a flameout in any engine and further indicates the particular engine which requires attention.

It will be understood that certain features and subcombinations are of utility and may be employed without reference to other features and subcombinations. It will be further obvious that various changes in detail may be made without departing from the spirit of my invention.

Having thus described my invention, what I claim is:

1. A flameout detector for an aircraft having a plurality of jet engines including in combination a corresponding plurality of turbine-discharge-pressure transducers each providing an output means responsive to the outputs for determining the minimum turbine-discharge pressure, means responsive to the outputs for determining the maximum turbine-discharge pressure, means for determining the ratio of said minimum to said maximum pressure, and means operable in response to a value of said ratio appreciably less than unity for providing a signal.

2. A detector as in claim 1 wherein the minimum-pressure-determining means comprises an OR Circuit.

3. A detector as in claim 1 wherein the maximum-pressure-determining means comprises an OR circuit.

4. A detector as in claim 1 wherein the minimum-pressure-determining means comprises a corresponding plurality of similarly polarized first diodes, wherein the maximum-pressure-determining means comprises a corresponding plurality of similarly polarized second diodes, and wherein the first diodes are polarized oppositely to the second diodes.

5. A detector as in claim 1 wherein the ratio-determining means includes means for determining the difference between said maximum and minimum pressures.

6. A detector as in claim 1 wherein the ratio-determining means includes a chopper circuit providing an output which is alternatively responsive to said minimum and maximum pressures.

7. A detector as in claim 1 wherein the ratio-determining means includes a variable-gain device.

8. A detector as in claim 1 wherein the ratio-determining means comprises a pentode having at least a semiremote cutoff characteristic.

9. A detector as in claim 1 wherein said transducers provide electrical outputs of negative polarity.

10. A detector as in claim 1 which further includes means responsive to said signal for providing an audible warning.

11. A detector as in claim 1 which further includes a corresponding plurality of comparing devices, means coupling each transducer to its corresponding comparing device, and means coupling the minimum-pressure-determining means to each of the comparing devices.

12. A detector as in claim 11 wherein the comparing devices comprise differential amplifiers.

13. A detector as in claim 11 which further includes a corresponding plurality of coincidence circuits, means coupling each comparing device to its corresponding coincidence circuit, and means coupling said signal to each of the coincidence circuits.

14. A detector as in claim 13 wherein each comparing device is coupled to inhibit its corresponding coincidence circuit.

15. A detector as in claim 13 which further includes means responsive to each coincidence circuit for providing a corresponding visual warning.

16. A flameout detector for an aircraft having a plurality of jet engines including in combination a corresponding plurality of turbine-discharge-pressure transducers each providing an output, means for determining the difference between two of said outputs, and means operable in response to a predetermined value of said difference for providing a signal.

17. A detector as in claim 16 for an aircraft having at least three engines wherein said two outputs are respectively proportional to the minimum-turbine-discharge pressure and to the maximum-turbine-discharge pressure.

18 A flameout detector for an aircraft having a plurality of jet engines including in combination a corresponding plurality of turbine-discharge-pressure transducers each providing an output, means for determining the ratio of two of said outputs, and means operable in response to a predetermined difference in the value of said ratio from unity for providing a signal.

19. A detector as in claim 18 for an aircraft having at least three engines wherein said two outputs are respectively proportional to the minimum-turbine-discharge pressure and to the maximum-turbine-discharge pressure.